Oct. 19, 1926.
A. K. PEHRSON
1,603,795
CONNECTION FOR ARTICULATED CARS
Filed Feb. 14, 1925   2 Sheets-Sheet 1
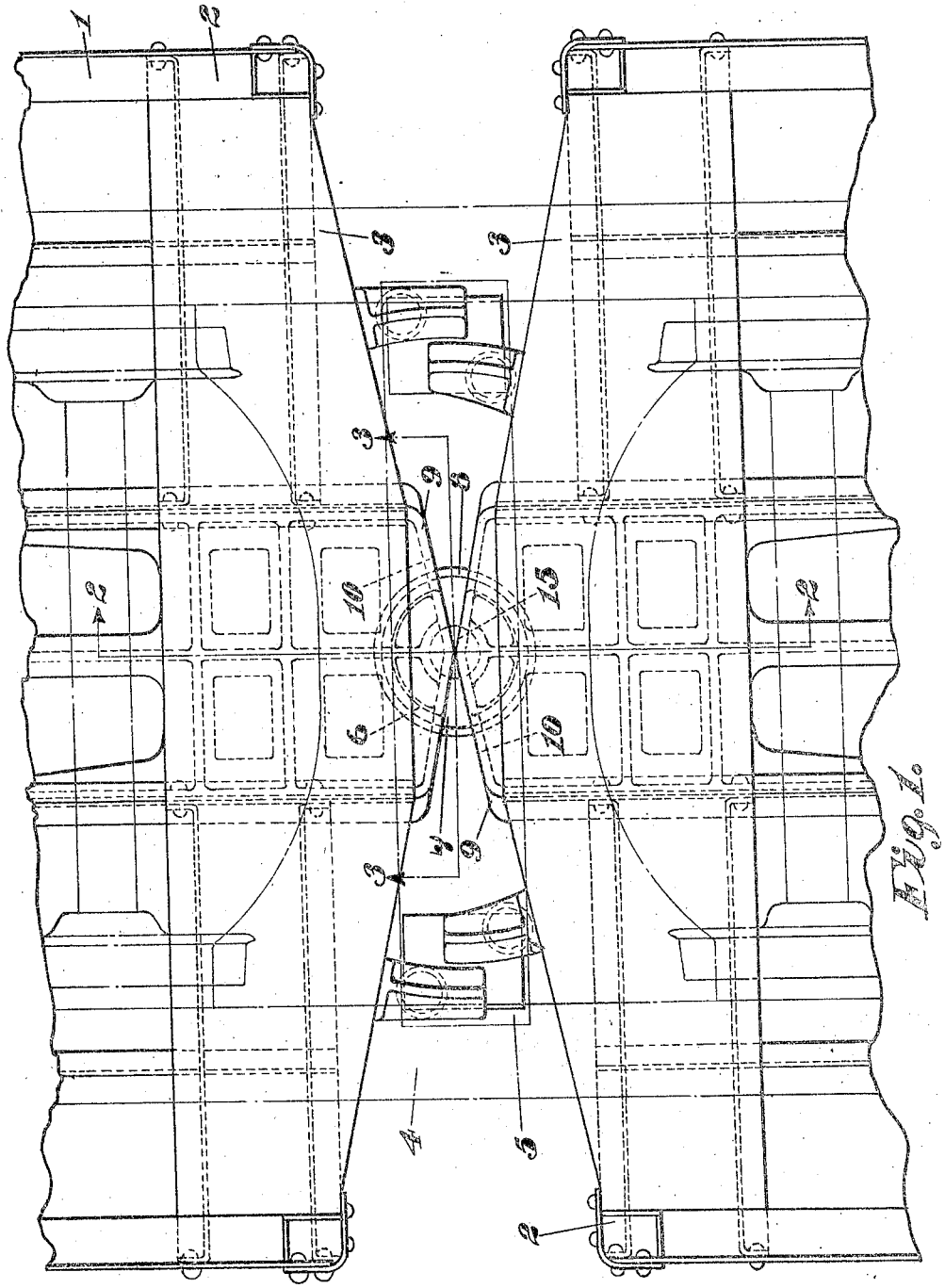

Oct. 19, 1926.
A. K. PEHRSON
1,603,795
CONNECTION FOR ARTICULATED CARS
Filed Feb. 14, 1925    2 Sheets-Sheet 2
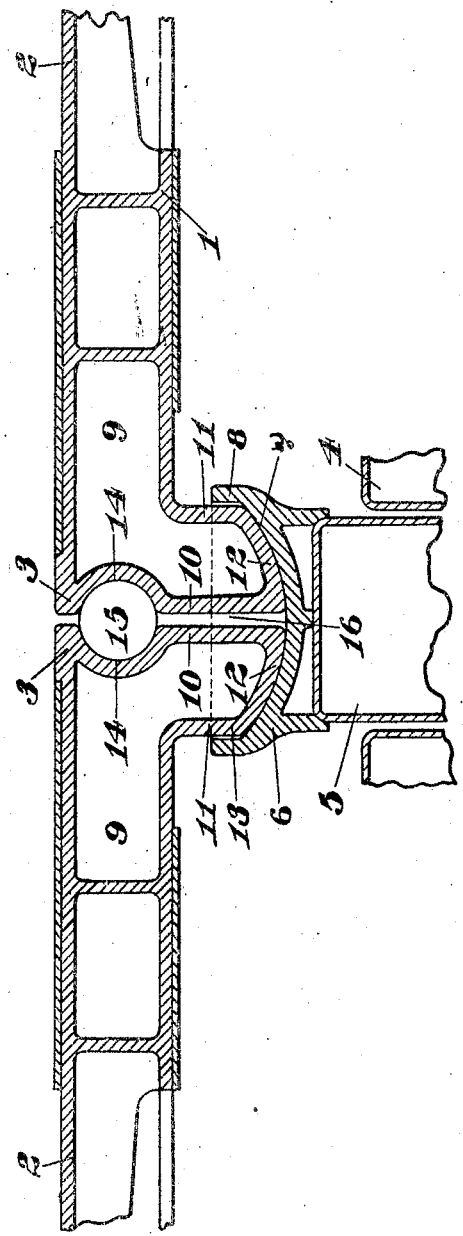
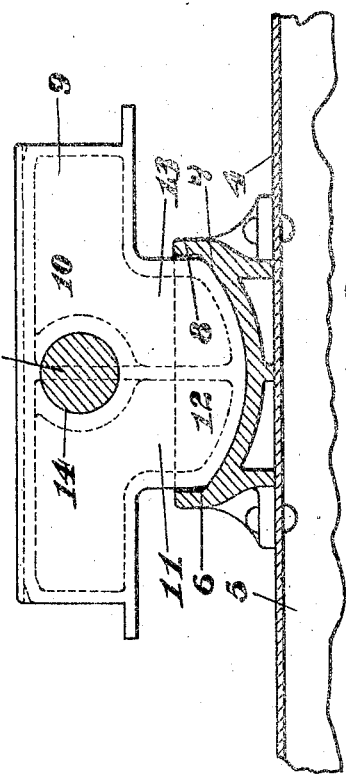
WITNESS
INVENTOR Patented Oct. 19, 1926.

1,603,795

UNITED STATES PATENT OFFICE.

ALFRED K. PEHRSON, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

CONNECTION FOR ARTICULATED CARS.

Application filed February 14, 1925. Serial No. 9,190.

An object of the invention is to provide a connection between the adjacent ends of adjacent car bodies of an articulated car, which will maintain these ends in such positions relative to each other that the longitudinal center lines of the car bodies will pass through the center of the connection at all times and yet such connection will permit a free swivelling movement in all directions.

Another object of the invention is to provide a swivel connection between the adjacent ends of the adjacent car bodies of an articulated car, which will maintain these bodies in such positions that their longitudinal center lines will pass through the center of the connection at all times, regardless of the position to which the cars have swivelled to each other.

Another object of the invention is to provide a connection between the adjacent ends of adjacent car bodies of an articulated car unit which will prevent vertical or horizontal movement of the ends of the bodies relative to each other and yet will permit free swivelling movement of said bodies relative to each other and will thus maintain the ends of such bodies in such relation to each other that the longitudinal center lines of said bodies will pass through the center of said connection at all times regardless of the position of the bodies relative to each other.

Another object of the invention is to provide a connection between the adjacent ends of two of the bodies of an articulated car unit which will maintain such ends in their proper operative positions relative to each other and at the same time will permit such ends to swivel freely relative to each other.

A further object of the invention is to provide a swivel connection between two adjacent car bodies of an articulated car unit which provides a greater bearing surface between the bodies than has heretofore been possible for transmitting the buffing and pulling shocks to which a car is subjected.

These and other objects will be apparent from the following description.

Referring to the drawings in which like reference characters refer to like parts, Fig 1 is a plan view of portions of the adjacent ends of two car bodies of the articulated car unit, embodying the invention; Fig. 2 is a longitudinal sectional view taken on the line 2—2 of Fig. 1; Fig. 3 is an enlarged cross sectional view taken on the line 3—3 of Fig. 1.

Referring now in detail to the drawings, the reference character 1 indicates an articulated car unit which comprises a plurality of car bodies 2. In the accompanying drawings the adjacent ends 3 of only two of such bodies have been illustrated but it will be understood that an articulated car unit may comprise two or any other desired number of bodies 2. When the car unit comprises two bodies, the adjacent ends 3 thereof are carried by a single truck 4 as shown in the drawings and each of the outer ends of such bodies (not shown) is carried by a truck, thus a car unit of two bodies is carried by three trucks. When the car unit comprises more than two bodies, the outer ends of the bodies at opposite ends of the car are each carried by a truck and the opposite end of each of these bodies and the adjacent end of an adjacent body are carried by a single truck, thus a car unit of three bodies will be carried by four trucks. The truck 4 may be of any suitable form or construction and is preferably provided with a truck bolster 5. Intermediate its ends this bolster is provided with a truck center plate 6 having a concave upper bearing surface 7 which, around its outer portion, terminates in an upwardly extending circular flange 8.

Each of the ends 3 of adjacent car bodies is provided with a member 9 which is suitably secured to the underframe of the car body and preferably forms a part thereof. Beyond the end of the car body this member is provided with an end wall 10 which extends on either side of the longitudinal center line at such an angle that when the adjacent ends of two of the bodies are suitably mounted on the truck the walls 10 of the members 9 will not interfere with each other as the bodies swivel in passing around a curve. The outer end portion of this member 9 has a downwardly depending portion 11, the lower surface 12 of which is in the form of a portion of a sphere and is adapted to engage a portion of the upper surface 7 of the center plate member 6 secured to the truck which surfaces 12 and 7 conform in contour with each other. The flange 8 of the truck center plate is adapted to engage with a vertically disposed portion 13 of the portion 11 of the member 9 to prevent the accidental separation of the body and the truck. Above the surface 12, and preferably near the top of the member 9, the end wall 10 thereof is provided with a recess or socket 14 in which a member 15 is adapted to be loosely mounted, such member in the present embodiment of the invention being in the form of a ball or sphere.

The surfaces 12 and 7 of the members 9 and center bearing member 6 respectively are concentric with the outer surface of the member 15 so that when the adjacent ends of two car bodies are in their proper operative positions as illustrated in the drawings, the member 15 will be almost entirely enclosed in the recesses 14, and the surfaces 12 and 7 will be in sliding engagement with each other, there being a space 16 of varying width provided between the end walls 10 to permit free swivelling movement of one body relative to the other. It will here be noted that the connection between the car bodies and the truck is such that the member 15 will prevent the underframe of one of the bodies from rising above the underframe of the adjacent body or any other such bodily movement and that it will permit free swivelling movement of the bodies relative to each other and at the same time maintain the ends of the bodies in such positions relative to each other that the longitudinal center lines of the bodies will pass through the center of the connection at all times regardless of the angle one car assumes relative to the other.

It will be further noted that the member 15 when mounted in the recesses 14, provides for a greater bearing surface for the transmission of buffing shocks than has heretofore been possible in a car of this type.

It will be apparent to those skilled in the art to which this invention appertains that changes may be made in the details of the several parts of the invention without departing from the spirit and scope of the appended claims.

Having thus described the invention, what I claim as new and desire to secure by Letters Patent is:—

1. In an articulated car comprising a plurality of car bodies, the adjacent ends of said bodies having recesses formed therein, and a member engaging said ends within said recesses for preventing relative sidewise and vertical movement between said ends.

2. In an articulated car comprising a plurality of car bodies having recesses formed in their adjacent ends, and a member extending between and engaging said ends within said recesses.

3. In an articulated car comprising a plurality of car bodies, the adjacent ends of said bodies being connected against relative vertical and horizontal movement by a member embedded in said ends.

4. In an articulated car comprising a plurality of car bodies, and means for connecting said ends, said means comprising a spherical member loosely mounted in both of said ends.

5. In an articulated car comprising a plurality of car bodies, a truck for carrying the adjacent ends of two of said bodies, and means connecting said ends, said means comprising a truck center bearing, a body center bearing on each of said ends adapted to engage said truck center bearing, and a spherical member loosely mounted in said ends above said bearings, the bearing surfaces of said bearings and member being concentric.

6. A connection for the adjacent ends of two bodies of an articulated car, comprising a spherical member mounted in said ends but not integral therewith.

7. A connection for the adjacent ends of two bodies of an articulated car, comprising body and truck center bearings, and a member loosely mounted in said ends above said bearings.

8. In an articulated car comprising a plurality of car bodies, a body center bearing member for each of the adjacent ends of two of said bodies, a truck, a truck center bearing member on said truck operatively engaged by both of said body center bearing members, and means above said truck center bearing member for transmitting buffing shocks from one of said bodies to the other.

9. In an articulated car comprising a plurality of car bodies, a truck supporting the adjacent ends of said bodies, and center bearing connecting means for said ends and truck, adapted to space apart said bodies to permit them to swivel in any direction, and at the same time maintain said ends in such positions that the longitudinal center lines of said bodies will pass through the center of the connection means at all times.

10. In an articulated car comprising a plurality of car bodies, and a connecting means for the adjacent ends of two of said bodies, said means comprising a member embedded in said ends adapted to maintain them in such positions that the longitudinal center lines of said bodies will pass through the center of said member.

11. In an articulated car comprising a plurality of car bodies, a truck supporting the adjacent ends of two of said bodies, center bearings between said bodies and truck, and a member extending between and engaging said ends, the bearing surfaces of such member and the bearing surfaces of said center bearings being concentric.

12. In an articulated car comprising a plurality of car bodies, a truck supporting and connecting the adjacent ends of two of said bodies and spherical means above said truck engaging said ends to maintain said ends in their proper positions against bodily movement relative to each other.

13. In an articulated car comprising a plurality of car bodies, a truck supporting and connecting the adjacent ends of two of said bodies, and means above said truck embedded in and engaging said ends to prevent one of said ends from rising above the other of said ends.

14. In an articulated car comprising a plurality of car bodies, the adjacent ends of two of said bodies being connected and an anti-climber member embedded in and engaging said ends.

15. In a connection for the adjacent ends of two bodies of an articulated car, comprising a body center bearing member for each of said bodies, a truck center bearing member with which said body center bearing members cooperate, and means for transmitting buffing shocks from one of said bodies to the other independent of said truck center bearing member.

16. In an articulated car comprising a plurality of spaced car bodies, a truck supporting the adjacent ends of two of said bodies, and means independent of said truck for transmitting buffing shocks from one of said ends to the other and for maintaining said bodies in spaced relation with each other.

17. In an articulated car comprising a plurality of car bodies, a truck supporting the adjacent ends of two of said bodies, said ends being spaced apart, and a member embedded in said ends adapted to maintain said ends in their spaced relation.

18. In an articulated car comprising a plurality of car bodies, a truck supporting the adjacent ends of two of said bodies, center bearing members on said bodies and truck adapted to cooperate to prevent longitudinal and transverse movement of said bodies relative to said truck and to each other, and means embedded in said ends above said truck for preventing relative vertical movement between said ends.

In testimony whereof I affix my signature.

ALFRED K. PEHRSON.